United States Patent [19]

Duerr

[11] Patent Number: 4,480,968
[45] Date of Patent: Nov. 6, 1984

[54] TWO-CYCLE ENGINE COMPRESSOR
[75] Inventor: John W. Duerr, Plymouth, Mich.
[73] Assignee: General Motors Corporation, Detroit, Mich.
[21] Appl. No.: 597,020
[22] Filed: Apr. 5, 1984
[51] Int. Cl.³ .................. F02B 37/00; F02B 17/00; F04B 35/00
[52] U.S. Cl. .................................... 417/380; 60/600; 60/605; 123/46 R; 123/65 B; 123/65 BA
[58] Field of Search .............. 417/380, 381; 123/65 B, 123/65 BA, 46 R; 60/605, 606, 601, 600

[56] References Cited

U.S. PATENT DOCUMENTS

| | | |
|---|---|---|
| 1,013,528 | 1/1912 | Broderick . |
| 2,091,451 | 6/1934 | Phillips . |
| 2,133,769 | 9/1937 | Jones . |
| 2,400,581 | 6/1942 | Walker . |
| 2,849,173 | 8/1958 | Surdy ................... 417/380 X |
| 3,237,847 | 3/1966 | Wilson ................... 417/381 |
| 3,447,313 | 6/1969 | Stoffel et al. ........... 123/65 BA X |
| 4,429,532 | 2/1984 | Nakuba ................ 417/380 X |

*Primary Examiner*—Wendell E. Burns
*Attorney, Agent, or Firm*—Robert J. Outland

[57] ABSTRACT

Arrangements for engine compressor units are disclosed in which power cylinders operating on the two-stroke cycle are provided with charging air from a blower or other source which also provides charging air to two-cycle compressor cylinders so as to increase compressor volumetric efficiency through the delivery of precompressed inlet charges.

5 Claims, 3 Drawing Figures

TWO-CYCLE ENGINE COMPRESSOR

TECHNICAL FIELD

This invention relates to engine driven air compressors and more particularly to two-cycle engine compressor units.

BACKGROUND

It is known in the art to provide a two-stroke cycle air compressor having one or more cylinders driven by an internal combustion engine also having one or more cylinders. The compressor and engine cylinders may be formed within a common frame, or crankcase, and have pistons connected to a common crankshaft and the engine cylinders may be operated on either a two or four-stroke cycle.

In two-stroke cycle engines, the cylinders may be scavenged and charged by a separate blower or air pump. The engine cylinder charge may also be further compressed by an exhaust driven supercharger or turbocharger.

Two-stroke air compressors are not required to be scavenged by a separate air pump but it is known to provide two stage compression by arranging two compressor units or cylinders in series. Properly matched, such an arrangement will inherently increase the volumetric flow, or charging efficiency, of the second stage compressor cylinder.

SUMMARY OF THE INVENTION

The present invention makes use of some of these prior art concepts together with additional construction features in order to provide novel arrangements of two-stroke cycle (two-cycle) compressors driven by two-cycle engines. The engine and compressor are preferably housed in a common crankcase and utilize a common blower both to charge and scavenge the engine cylinders and to charge the compressor cylinders, thereby increasing their volumetric charging efficiency.

In preferred embodiments engine compressor units may be made for example by modifying engines from a line of known two-cycle General Motors diesel engines having uniflow scavenging. The modified engines are provided with nonported cylinder liners and special cylinder heads in some of the cylinders, preferably those of one bank of a V-type engine, to operate on a two-stroke compressor cycle. Connection of the compressor cylinder head inlet ports with the engine air box allows using pressurized charging air from the engine blower for charging the compressor cylinders also.

In additional preferred embodiments, a turbocharger driven by exhaust from the engine cylinders may be mounted to provide compressed intake air to the charging blower. If desired, an aftercooler may also be provided after the blower to reduce the temperature of charging air delivered by the engine blower to the air box, thus further increasing volumetric efficiency of both the engine and compression cylinders.

These and other features and advantages of the present invention will be more fully understood from the following description of certain preferred embodiments taken together with the accompanying drawings.

BRIEF DRAWING DESCRIPTION

DETAILED DESCRIPTION

Figure 1:
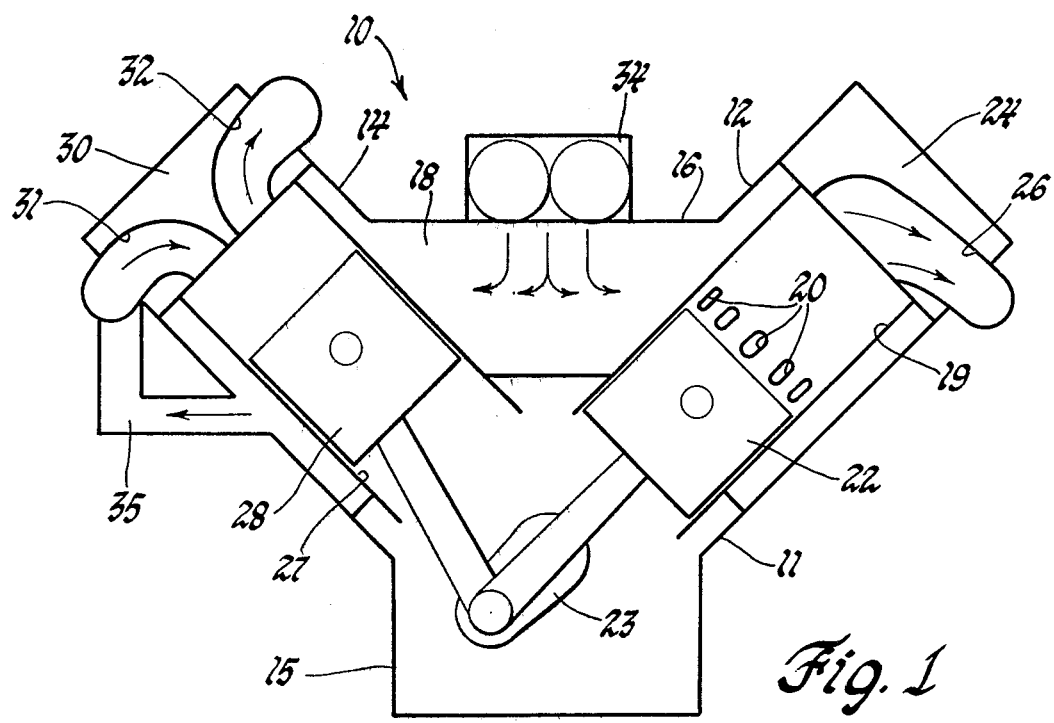
FIG. 1 is a partially schematic transverse cross-sectional view of a two-cycle engine compressor unit with a common charging blower in accordance with the invention.

In the drawings, numeral 10 generally indicates a two-stroke cycle (two-cycle) engine compressor unit formed in accordance with the invention. Engine compressor 10 includes a frame or crankcase 11 having a pair of cylinder banks 12, 14 arranged in V-fashion and closed at their bottom ends by an oil pan 15. An upper wall 16 extending between the cylinder banks partially defines an air box, or charging air chamber, 18 extending within the upper portion of the crankcase between and into the cylinder banks.

Cylinder bank 12 of the engine compressor includes a plurality of aligned cylinders 19, only one of which is shown, defined by cylinder liners which have air inlet ports 20 intermediate their ends opening to the air box 18. Power pistons 22 are reciprocably disposed within the power cylinders 19 and are connected with a crankshaft 23 that is rotatably supported in the crankcase at the base of the V formed by the cylinder banks. The power pistons 22 are reciprocable within their respective cylinders 19 between top dead center positions near the outer end of the cylinder bank 12 and bottom dead center positions near the crankshaft. The reciprocating movement of the power piston 22 controls communication of the inlet ports with the interior of the cylinders so that the ports are open only when their respective pistons are at or near their bottom dead center positions.

A cylinder head 24, mounted on the cylinder bank 12, closes the ends of the power cylinders 19. The cylinder head 24 incorporates exhaust passages 26 and suitable exhaust valves and valve actuating gear, not shown, which operates in timed relation with crank rotation and piston reciprocation to provide operation of the power cylinders on a two-stroke power cycle in conventional fashion.

Cylinder bank 14, on the other hand, includes a plurality of compressor cylinders 27 defined by unported cylinder liners disposed in the cylinder bank 14, generally opposite power cylinders of the cylinder bank 12. Within the compressor cylinders 27 there are compressor pistons 28 which are likewise connected to the common crankshaft 23. The compressor pistons 28 are reciprocable within their respective cylinders 27 between a top a dead center position located near the outer end of the cylinder bank 14 and a bottom dead center position located near the crankshaft 23.

A cylinder head 30, which may be of any known type suitable for use in a two-cycle compressor of the type described, is mounted on the outer end of the cylinder bank 14 and closes the ends of the compressor cylinders 27. Intake and discharge passages 31, 32 are provided within the cylinder head 30 communicating with each of the compressor cylinders. Suitable intake and discharge valves, not shown, are also provided to allow the flow of intake air into the cylinders 27 through the intake passages 31 and the discharge of compressed air from the cylinders 27 through the discharge passages 32.

A charging air blower 34 of any suitable type, for example the positive displacement lobed impeller Roots type, is mounted between the cylinder banks on the upper wall 16 of the engine. The blower 34 is operative to draw in ambient air from the engine exterior and discharge the air at a higher pressure level into the air box 18, the charging pressure partially depending upon the internal restriction to air flow through the engine compressor unit.

A connecting conduit 35 between the air box 18 and the compressor intake passages 31 provides communication for conducting pressurized air supplied by the charging blower 34 from the air box 18 to the compressor cylinder intake passages 31 for admission to the compressor cylinders 27. The cylinder inlet ports 20 of the power cylinders 19 permit the entry of air from the air box 18 into the power cylinders for scavenging and charging them whenever their respective power pistons 22 are in their bottom dead center positions. The power cylinders are further provided with suitable means, not shown, for delivering and burning fuel for the development of power in conventional fashion and are preferably arranged for operation on the diesel cycle utilizing direct fuel injection.

In a preferred embodiment, an engine compressor unit of the type described may be formed by modifying a two-stroke cycle diesel engine of, for example, the General Motors series 71 or 92 types manufactured by the Detroit Diesel Allison Division. This may be accomplished, for instance, by converting one of the cylinder banks of a V-type engine to compressor operation by replacing the ported cylinder liners with unported liners and providing on that cylinder bank a cylinder head having conventional compressor inlet and outlet ports and valving, the inlet ports being connected through a suitable conduit with the engine air box.

In operation of an engine compressor in accordance with the embodiment of FIG. 1, fuel intermittently delivered to the power cylinders is ignited and burned, causing reciprocation of the power pistons on a two-stroke cycle. The operating cycle includes the admission of charging air from the air box through the intake ports 20 into the cylinders, compression of the air charges as the pistons move toward top dead center, delivery and burning of fuel near top dead center with expansion of the burned gases as the pistons move toward bottom dead center, and exhaust of the burned gases with scavenging and recharging of the cylinders as the pistons approach bottom dead center and compressed air from the air box flows through the intake ports into the cylinders.

The reciprocating movement of the power pistons 22 rotatably drives the crankshaft 23 which, in turn, reciprocates the compressor pistons 28 within their cylinders 27. On their downstrokes, the pistons allow the admission of charging air into their cylinders from the engine air box through the conduit 35 and intake passages 31. Thereafter, on their upstrokes, the pistons compress the air charges to the existing discharge pressure. The high pressure air is then discharged through the discharge passages 32 as the pistons continue to move toward their top dead center positions.

The initial precompression of the charging air by the charging blower 34 delivers a more dense charge of air into the compressor cylinders than would be the case if the cylinders were charged merely by the suction of the pistons drawing in ambient air. This provides a higher volumetric efficiency and greater mass flow through the compressor as well, as a potentially higher outlet pressure, than would be the case without the delivery of precompressed air to the compressor cylinders.

Figure 2:
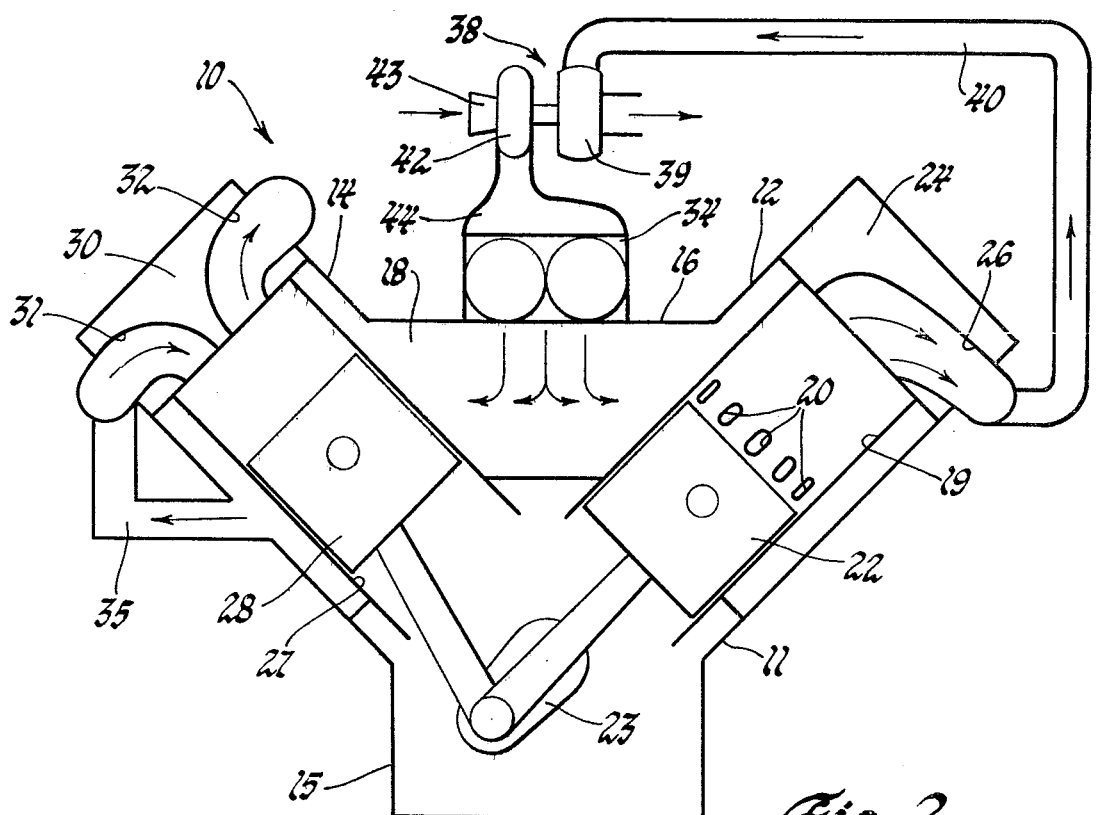
FIG. 2 is a cross-sectional view similar to that of FIG. 1 and showing an alternative embodiment additionally including a turbocharger supplying compressed charging air to the blower.

Referring to FIG. 2 of the drawings, there is disclosed an engine arrangement which, in its basic configuration, is essentially similar to that of FIG. 1, so that like numerals are used to identify like parts. The arrangement differs from that of the first described embodiment primarily in that a turbocharger 38 is provided on the engine compressor. That turbocharger includes a turbine 39 which is driven by exhaust gases conducted by a conduit 40 from the engine exhaust passages 26. The turbine drives a compressor 42 which receives ambient air through an inlet 43 and discharges it through a connecting duct 44 to the inlet of the charging blower 34.

The turbocharger is preferably matched with the engine to provide, at least under the higher load conditions of normal operation, inlet air to the blower at a charging pressure level substantially increased over ambient. This inlet air is then discharged through the blower into the engine air box at a high pressure level which may or may not be greater than that delivered by the turbocharger, depending upon the charging system design and engine operating conditions.

For best efficiency, the air box pressure at rated output may be substantially equal to that at the turbocharger discharge, since the compression efficiency of the turbocharger impeller is generally higher than that of the Roots type charging blower provided primarily for starting and low load operation of the engine. However, to maximize compressor flow, it may be preferable to use the blower to further increase the pressure of charging air delivered by the turbocharger. The increased pressure level of the air box due to operation of the turbocharger is, of course, available not only for providing a more dense charge and, therefore, potentially greater power from the engine power cylinders, but also inherently provides a more dense charge to the engine compressor cylinders with a resultant further increase in volumetric efficiency and potential maximum outlet pressure.

Figure 3:
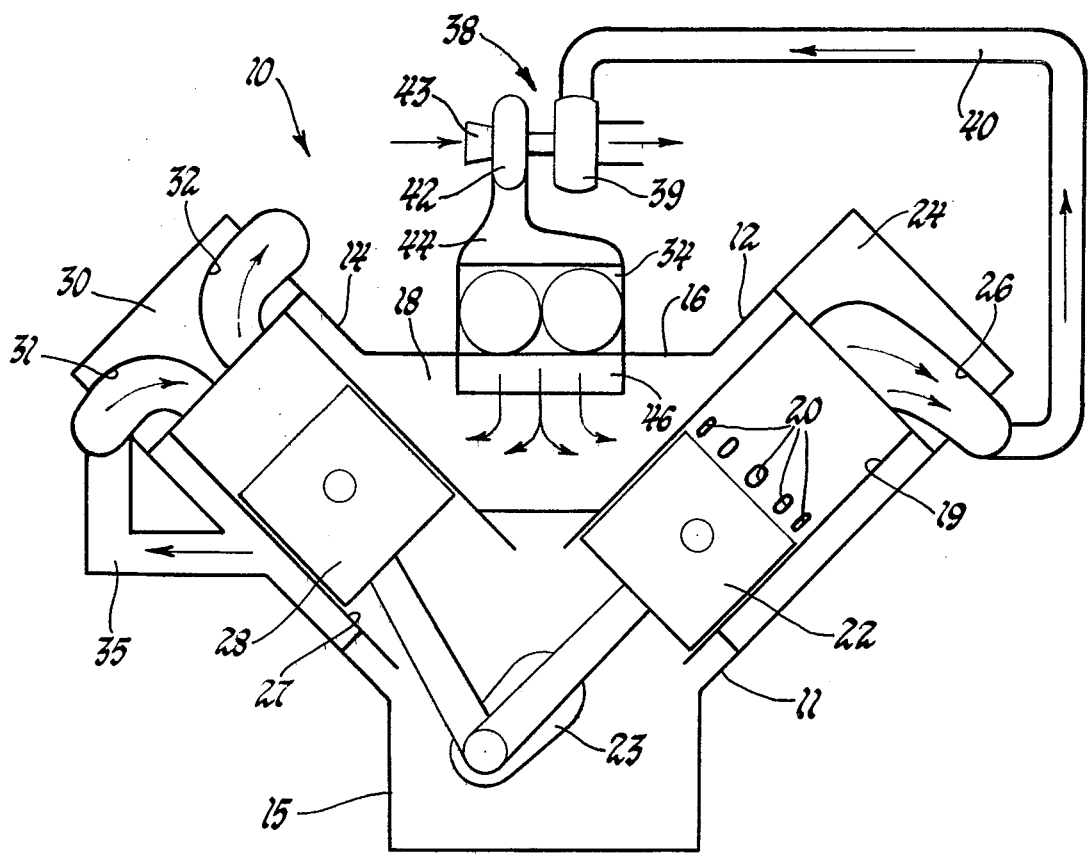
FIG. 3 is a cross-sectional view similar to that of FIG. 2 wherein the construction further includes an aftercooler at the outlet of the charging blower.

Turning now to FIG. 3 of the drawings, there is shown an arrangement essentially like the embodiment of FIG. 2 so that like reference numerals have been used for like components. The embodiment of FIG. 3 differs from that of FIG. 2 in that an aftercooler 46 is disposed within the air box at the outlet of the charging air blower 34. This aftercooler may be supplied with engine coolant, or other cooling fluid, and constitutes a heat exchanger through which the charging air from the blower 34 is conducted before passing into the air box 18. At higher loads, the aftercooler acts to cool the charge of compressed air delivered to the air box. The cooling action of the aftercooler operates in conventional manner to increase the density of the air charge in the air box so as to provide greater mass flow of charging air into both the power and compressor cylinders and thereby increase the charging efficiency of the overall engine compressor unit.

The illustrated embodiments represent only three of the many possible arrangements which might be provided in accordance with the invention to form engine compressor units having two-stroke cycle engine power cylinders charged and scavenged by charging means which are also available to charge the associated compressor cylinders. Additional modifications could include the addition of a blower bypass between the turbocharger and the engine air box or the replacement of the Roots type blower with an engine driven centrifugal blower which could, if desired, be combined with the turbocharger unit. These and other changes which may be made within the spirit and scope of the inventive concepts described are intended to be included within the invention defined by the scope of the following claims.

The embodiments of the invention in which an exclusive property or privilege is claimed are defined as follows:

1. A positive displacement multiple cylinder engine compressor comprising
    a scavenging and charging air pump operative to provide pressurized air,
    at least one power cylinder assembly operative on a two-stroke power cycle and having first air admission means connected with the pump to receive pressurized air therefrom for scavenging and charging the power cylinder assembly,
    at least one compressor cylinder assembly connected to be driven by the power cylinder assembly on a two-stroke compressor cycle and having second air admission means connected with the pump to receive pressurized air therefrom for charging the compressor cylinder assembly, said second air admission means opening through an end of the compressor cylinder assembly that also communicates with compressed air discharge means,
    whereby a common air pump provides pressurized air for scavenging and charging the power cylinder assembly and for delivering a precompressed charge to the compressor cylinder assembly to increase compressor volumetric efficiency.

2. A positive displacement multiple cylinder engine compressor comprising
    a frame defining an air chamber,
    a scavenging and charging air pump operative to provide pressurized charging and scavenging air to said air chamber,
    at least one power cylinder assembly including a power cylinder and a power piston reciprocable therein between top and bottom dead center positions on a two-stroke power cycle, said power cylinder having air admission ports communicating said air chamber with the power cylinder interior, said ports being located for control by movement of the power piston to be open for admission of pressurized charging and scavenging air to the power cylinder only when the power piston is near its bottom dead center position,
    at least one compressor cylinder assembly including a compressor cylinder and a compressor piston connected to be reciprocably driven by the power cylinder assembly between top and bottom dead center positions on a two-stroke compressor cycle, said compressor cylinder having admission and exhaust openings only at one end adjacent to the top dead center position of the compressor piston, said admission opening being connected with said air chamber to conduct pressurized charging air therefrom to the compressor cylinder,
    whereby a common air pump supplying the air chamber provides pressurized air for scavenging and charging the power cylinder and for delivering a precompressed charge to the compressor cylinder to increase compressor volumetric efficiency.

3. A positive displacement multiple cylinder turbocharged engine compressor comprising
    a frame defining an air chamber,
    a scavenging and charging air pump operative to provide pressurized charging and scavenging air to said air chamber,
    a turbocharger connected to at least one of the air pump and the air chamber to supply, when operative, more highly pressurized air to the air chamber,
    at least one power cylinder assembly including a power cylinder and a power piston reciprocable therein between top and bottom dead center positions on a two-stroke power cycle, said power cylinder having exhaust means at one end adjacent to the power piston top dead center position and air admission ports communicating said air chamber with the power cylinder interior, said ports being located for control by movement of the power piston to be open for admission of pressurized charging and scavenging air to the power cylinder only when the power piston is near its bottom dead center position, said exhaust means being connected with the turbocharger for driving the same when adequate exhaust energy is present,
    at least one compressor cylinder assembly including a compressor cylinder and a compressor piston connected to be reciprocably driven by the power cylinder assembly between top and bottom dead center positions on a two-stroke compressor cycle, said compressor cylinder having admission and exhaust openings only at one end adjacent to the top dead center position of the compressor piston, said admission opening being connected with said air chamber to conduct pressurized charging air therefrom to the compressor cylinder
    whereby common air pump and turbocharger means supplying the air chamber provide pressurized air for scavenging and charging the power cylinder and for delivering precompressed charges to the compressor cylinder to increase compressor volumetric efficiency.

4. An engine compressor according to claim 3 and further comprising an aftercooler disposed between the air chamber and the turbocharger to cool the compressed charges entering the air chamber and thereby further increase the charging efficiency of the engine cylinder and the compressor volumetric efficiency.

5. The combination of claim 4 wherein the air pump is connected in series between the turbocharger and the aftercooler to provide cooling of air compressed by either the turbocharger or the air pump.

* * * * *